United States Patent [19]

Hibino et al.

[11] 3,874,876

[45] Apr. 1, 1975

[54] POLYETHYLENE TEREPHTHALATE FILM FOR USE AS SUPPORT OF X-RAY FILM

[75] Inventors: Noburo Hibino; Kunihira Seto; Teruo Kobayashi; Kazuo Inoue, all of Minami Ashigara, Kanagawa, Japan

[73] Assignee: Fuji Photo Film Co., Ltd., Minami Ashigara, Kanagawa, Japan

[22] Filed: Apr. 13, 1973

[21] Appl. No.: 350,867

[30] Foreign Application Priority Data
Apr. 13, 1972 Japan............................. 47-037274

[52] U.S. Cl................. 96/84 R, 96/87 R, 260/40 R
[51] Int. Cl............................................... G03c 1/84
[58] Field of Search......... 96/87 R, 84 R; 260/40 R, 260/40 P

[56] References Cited
UNITED STATES PATENTS

| | | | |
|---|---|---|---|
| 3,475,173 | 10/1969 | Kimura et al. | 96/87 R |
| 3,488,195 | 1/1970 | Hunter | 96/87 R |
| 3,720,693 | 3/1973 | Peters et al. | 260/40 P |
| 3,728,124 | 4/1973 | Whyte | 96/87 R |

FOREIGN PATENTS OR APPLICATIONS
969,059   9/1964   United Kingdom

*Primary Examiner*—J. Travis Brown
*Attorney, Agent, or Firm*—Sughrue, Rothwell, Mion, Zinn & Macpeak

[57] ABSTRACT

A polyethylene terephthalate film for use as a base of an X-ray film which contains at least one dye selected from the group consisting of 1-(2',6'-dimethylanilino)-4,5,8-trihydroxyanthraquinone, 1-(2',4',6'-trimethylanilino)-4,5,8-trihydroxyanthraquinone, 1-(2',6'-diethylanilino)-4,5,8-trihydroxyanthraquinone and 1-(2'-methyl-6'-ethylanilino)-4,5,8-trihydroxyanthraquinone. These dyes simultaneously meet the requirements of thermal stability, sublimation resistance, compatibility and good color, and are inert to X-ray silver halide emulsions and free from adverse effects on photographic properties such as sensitivity, gamma or fog.

13 Claims, No Drawings

POLYETHYLENE TEREPHTHALATE FILM FOR USE AS SUPPORT OF X-RAY FILM

BACKGROUND OF THE INVENTION

1. Field of the Invention

This invention relates to a polyethylene terephthalate film for use as a support of an X-ray film, more specifically to a polyethylene terephthalate film colored blue or bluish-violet which is useful as a support of an X-ray film.

2. Description of the Prior Art

In an X-ray film, the support film is desirably colored blue or bluish violet in order to make it easy to discriminate the photographic images. Furthermore, the X-ray film preferably has a reduced absorption of light in the short wavelength region. This is for the purpose of removing the defect that because both surfaces of the support are coated with a photographic emulsion, the X-ray film undergoes filter desensitization at the time of photography to give images having a yellow fog which are not easy to discriminate.

In order to achieve this, dyes for coloring a polyethylene terephthalate film used as a support of an X-ray film must simultaneously possess thermal stability, sublimation resistance, good compatibility with the polyethylene terephthalate and a suitable color. Moreover, they must be inert to silver halide emulsions and must not adversely affect the photographic properties such as sensitivity, gamma or fog.

Commercial production of polyethylene terephthalate films depends upon heat melting and extrusion and, therefore, coloring agents for the polyethylene terephthalate need to have thermal resistance in order to withstand temperatures as high as 270° to 320°C. Since the polyethylene terephthalate film has a very stable physical structure, an expedient such as dyeing cannot easily result in its coloration. Accordingly, there can conveniently be used the dope coloring method in which a coloring agent is dispersed or dissolved in the polyethylene terephthalate during the synthesis of the polymer or during its melt fabrication.

Thus, the coloring dyes for polyethylene terephthalate are required to have a high degree of thermal stability which enables them to withstand fabricating temperatures as high as 270° to 320°C. and not decompose or discolor. Among known dyes which can be used for dyeing polyesters at a temperature ranging from room temperature to 200°C., there is hardly any dye which can endure use at 270° to 320°C. For example, as dyes for polyesters French Pat. No. 1,409,941 discloses 1,5-dihydroxy-4,8-diaminoanthraquinone; Belgian Pat. No. 646,061, 1,5-dihydroxy-4,8-diamino-2-phenylanthraquinone; and Belgian Pat. No. 893,471, 1-amino-2-cyano-4-methylaminoanthraquinone. All of these dyes disclor at 270° to 320°C. and cannot be used at such temperatures.

1-Methyl-amino-4-toluidinoanthraquinone, 1,4-bis-benzylaminoanthraquinone, 1,4-diethylaminoanthraquinone, and 1,4-dihexylaminoanthraquinone also discolor at 270°–320°C. and cannot be used.

Polyethylene terephthalate films are produced by a process comprising drying polyethylene terephthalate chips, heating them, melt extruding them, stretching the extruded film, and heat-treating the film. The drying step is preferably carried out at 135°–210°C., as described in Japanese Patent Publication No. 618/53. If drying is not performed, polyethylene terephthalate undergoes hydrolysis when heated and melted, which results either in failure of film formation or in the formation of a film of extremely poor properties, such as poor strength. On the other hand, since the film-formation of polyethylene terephthalate is usually effected using a tenter, edge loss cannot be avoided. The edge waste is pulverized and dried together with virgin chips. If the polyethylene terephthalate is colored with a dye of poor sublimation resistance, the dye sublimes from the edge waste during drying. Accordingly, not only is there a loss of dye, but also the dye contaminates the dryer or the edge waste falls down irregularly to cause unevenness in the density of the color.

The film-forming process also includes a step of extruding polyethylene terephthalate from an extrusion die onto a casting drum, and cooling the polymer. If the polyethylene terephthalate is colored with a readily sublimable dye, the dye sublimes and contaminates the casting drum, and the colored film itself has uneven color density. It is essential therefore to color the polyethylene terephthalate film using dyes with good sublimation resistance.

In dope coloration, it is first necessary that the coloring dye be readily dispersible or uniformly soluble in the polyethylene terephthalate. Typical dope or mass coloring processes useful with polyethylene terephthalate are described in, e.g., British Pat. Nos. 1,137,595 and 1,196,707.

Especially for use as a photograhic film support, the film is required to have a high level of transparency and an optically perfect surface. Therefore, clouding of the support as a result of insufficient dispersion of the coloring agent in polyethylene terephthalate, or the presence of particulate foreign matter is not permitted at all.

As is well known, in order to attain useful properties, an amorphous unoriented polyethylene terephthalate film resulting from melt fabrication should be stretched and heat-treated under proper temperature conditions. Accordingly, even when the coloring agent is apparently uniformly dispersed in the amorphous unoriented film so as not to impair the transparency of the film, it happens very frequently that in the subsequent stretching step gaps occur between the fine dispersed particles of the coloring agent incapable of plastic deformation and the polyethylene terephthalate matrix capable of plastic deformation, and they scatter light to increase the cloudiness of the film. In the production of a photographic film base, therefore, sufficient care must be taken by dispersing the coloring agent as extremely fine particles so as not to bring about a substantial increase in light scattering in the stretching step, or by dissolving the coloring agent in the polyethylene terephthalate in the form of a molecular dispersion. These factors are well known to those in the art.

SUMMARY OF THE INVENTION

It is an object of this invention to provide coloring agents for a polyethylene terephthalate film for use as an X-ray film base, which simultaneously meet the stringent requirements of good photographic properties, thermal stability, compatibility and color.

After screening dyes having various structures, we have found that 1-(2',6'-dimethylanilino)-4,5,8-trihydroxyanthraquinone, 1-(2',4',6'-trimethylanilino)-

4,5,8-trihydroxyanthraquinone, 1-(2',6'-diethylanilino)-4,5,8-trihydroxyanthraquinone and 1-(2'-methyl-6'-ethylanilino)-4,5,8-trihydroxyanthraquinone meet the above-mentioned requirements.

DETAILED DESCRIPTION OF THE INVENTION

These dyes can be prepared by the condensation reaction of 1,4,5,8-hexahydroxyanthraquinone or its leuco product with aniline derivatives, as disclosed, for example, in Japanese Patent Publication No. 14,149/63 or British Patent Specification No. 969,059. The above dyes simultaneously meet the requirements as to photographic properties, thermal stability, sublimation resistance and compatibility heretofore discussed.

As to the photographic properties, these dyes are characterized by being photographically inert to X-ray emulsions and do not adversely affect sensitivity, gamma and fog.

The dyes of the present invention are most preferably incorporated into the polyethylene terephthalate in an amount of from 0.01 to 0.03 wt percent, based on polyethylene terephthalate weight. Amounts much less will sometimes not provided the desired effect, while no improvement is provided with greater amounts as compared to 0.03 wt percent.

The polyethylene terephthalate/dye assembly of the present invention can be used with any X-ray emulsion. As the X-ray emulsion, most preferred results are obtained when silver iodobromide and/or silver chloroiodobromide are used. The content of silver halide other than AgBr is generally less than 5 mole percent in such emulsions.

As is the case with commercial X-ray emulsions, the overage particle size of the silver halide is preferably about $1\mu$, almost always $0.3-3\mu$, for good sensitivity (in determining average particle size, small and large particles can be used).

X-ray emulsions are usually prepared by the ammoniacal process, which is a general black and white photographic emulsion preparation, and such are most suitable for use in the present invention.

As is the case with most commercial X-ray emulsions, the emulsion is coated at a $1-20\mu$ dried thickness.

The following Examples will illustrate the present invention.

EXAMPLE 1

Dried polyethylene terephthalate chips were mixed with 0.02 percent by weight of 1-(2',6'-diethylanilino)-4,5,8-trihydroxyanthraquinone dye, and the mixture was fabricated into a film of a thickness of 0.180 mm by an ordinary melt film-forming method at 290°C. The resulting film was bluish-violet and free from reduced transparency, clouding, and defects ascribable to the dispersed particles of the dye. The particles cannot be seen even using an electron microscope, and it is considered that the particles are dispersed in the molecular condition or in the molten condition. No undue contamination of the casting drum was observed during film-formation.

Both surfaces of the film were subjected to irradiation with ultraviolet rays for 1 minute at 80°C. in air using a 1KW quartz mercury lamp 100 mm from the film, and then, immediately coated with a dispersion of the following formulation, followed by drying for 2 minutes at 120°C.

| Formulation of the dispersion | |
|---|---|
| Gelatin | 1 part by weight |
| Water | 1 part by weight |
| Salicylic acid | 0.3 part by weight |
| Methanol | 20 parts by weight |
| Acetone | 60 parts by weight |
| Methylene chloride | 14 parts by weight |
| Benzyl alcohol | 3 parts by weight |
| o-Chlorophenol | 3 parts by weight |

After this undercoating layer was applied ($0.4-1\mu$ thickness), both surfaces of the film were coated with an X-ray gelatin/silver halide emulsion as described in Example 1 of U.S. Pat. No. 3,619,198, the coating thickness of the emulsion layer being about $12\mu$ (dried thickness), to form an X-ray film for use in medical treatment.

An X-ray image was produced on the resulting X-ray film through an object. The developed image could be easily discriminated, and the photographic properties of the film, and as sensitivity, gamma or fog, were not changed at all.

EXAMPLE 2

The same procedure as in Example 1 was repeated to form an identical X-ray film except that 0.025 percent by weight of 1-(2',6'-dimethylanilino)-4,5,8-trihydroxyanthraquinone was used as the dye. There was obtained a film having a thickness of 0.180 mm, which was bluish violet and free from reduced transparency, clouding, or defects ascribable to dispersed particles of the dye.

Both surfaces of the resulting film were coated with an X-ray emulsion, and an X-ray image was produced thereon in the same manner as in Example 1. The developed image could be easily discriminated, and the photographic properties of the film such as sensitivity, gamma or fog were not changed at all.

On the other hand, 1-(2',6'-dimethoxyanilino)-4,5,8-trihydroxyanthraquinone disclosed in Japanese Patent Publication No. 14,149/63 and British Pat. No. 969,059 caused filter desensitization because of high absorption of light of a wavelength of 400 to 420 m$\mu$. When this dye was heated together with polyethylene terephthalate for 30 minutes at 300°C., it became increasingly brownish, and exhibited poor heat stability.

EXAMPLE 3

The same procedure as in Example 1 was repeated except that 1-(2',4',6'-trimethylanilino)-4,5,8-trihydroxyanthraquinone or 1-(2'-methyl-6'-ethylanilino)-4,5,8-trihydroxyanthraquinone was used as the dye. The results obtained were similar to those obtained in Example 1.

While the invention has been described in detail and with reference to specific embodiments thereof, it will be apparent to one skilled in the art that various changes and modifications can be made therein without departing from the spirit and scope thereof.

What is claimed is:

1. A polyethylene terephthalate film for use as a support of a silver halide X-ray film comprising polyethylene terephthalate and one or more dyes selected from the group consisting of 1-(2',6'-dimethylanilino)-4,5,8-trihydroxyanthraquinone, 1-(2',4',6'-trimethylanilino)-4,5,8-trihydroxyanthraquinone, 1-

(2',6'-diethylanilino)-4,5,8-trihydroxyanthraquinone and 1-(2'-methyl-6'-ethylanilino)-4,5,8-trihydroxyanthraquinone.

2. The film of claim 1 wherein one dye is present and the dye is 1-(2',6'-dimethylanilino)-4,5,8-trihydroxyanthraquinone.

3. The film of claim 1 where one dye is present and the dye is 1-(2',4',6'-trimethylanilino)-4,5,8-trihydroxyanthraquinone.

4. The film of claim 1 where one dye is present and the dye is 1-(2',6'-diethylanilino)-4,5,8-trihydroxyanthraquinone.

5. The film of claim 1 where one dye is present and the dye is 1-(2'-methyl-6'-ethylanilino)-4,5,8-trihydroxyanthraquinone.

6. The film of claim 1 where more than one dye is present.

7. The film of claim 1 wherein the one or more dyes are present in an amount of from 0.01 to 0.03 wt. percent, based on polyethylene terephthalate weight.

8. An X-ray film comprising an X-ray sensitive silver halide photographic emulsion layer coated on one or both sides of a polyethylene terephthalate film which contains one or more days selected from the group consisting of 1-(2',6'-dimethylanilino)-4,5,8-trihydroxyanthraquinone, 1-(2',4',6'-trimethylanilino)-4,5,8-trihydroxyanthraquinone, 1-(2',6'-diethylanilino)-4,5,8-trihydroxyanthraquinone and 1-(2'-methyl-6'-ethylanilino)-4,5,8-trihydroxyanthraquinone.

9. An X-ray film as claimed in claim 8 wherein one dye is present and the dye is 1-(2',6'-dimethylanilino)-4,5,8-trihydroxyanthraquinone.

10. An X-ray film as claimed in claim 8 wherein one dye is present and the dye is 1-(2',4',6'-trimethylanilino)-4,5,8-trihydroxyanthraquinone.

11. An X-ray film as claimed in claim 8 wherein one dye is present and the dye is 1-(2',6'-diethylanilino)-4,5,8-trihydroxyanthraquinone.

12. An X-ray film as claimed in claim 8 wherein one dye is present and the dye is 1-(2'-methyl-6'-ethylanilino)-4,5,8-trihydroxyanthraquinone.

13. An X-ray film as claimed in claim 8 wherein the one or more dyes are present in an amount of from 0.01 to 0.03 wt. percent, based on polyethylene terephthalate weight.

* * * * *